No. 660,750. Patented Oct. 30, 1900.
P. CUNNINGHAM.
DRIVING MECHANISM.
(Application filed Mar. 10, 1900.)
(No Model.) 2 Sheets—Sheet 1.
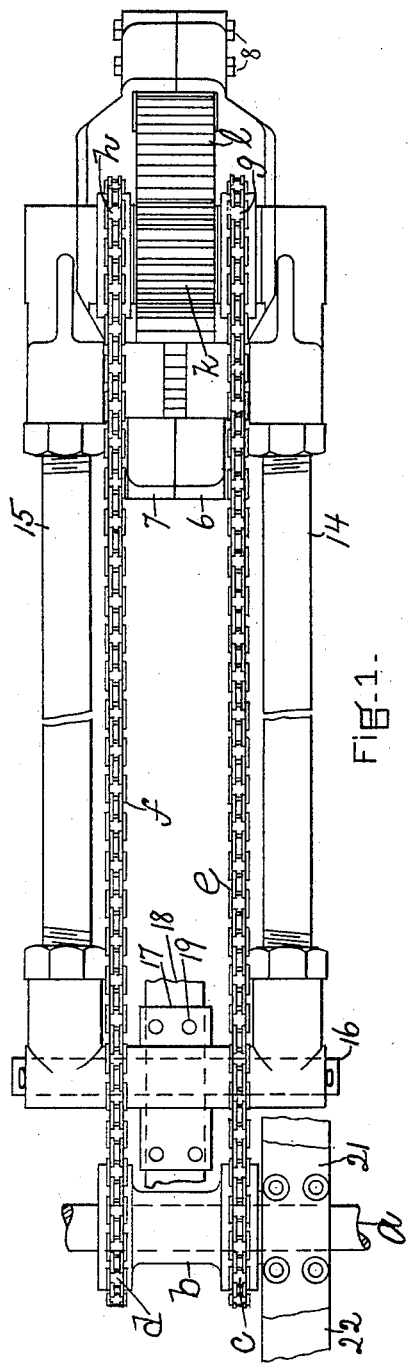
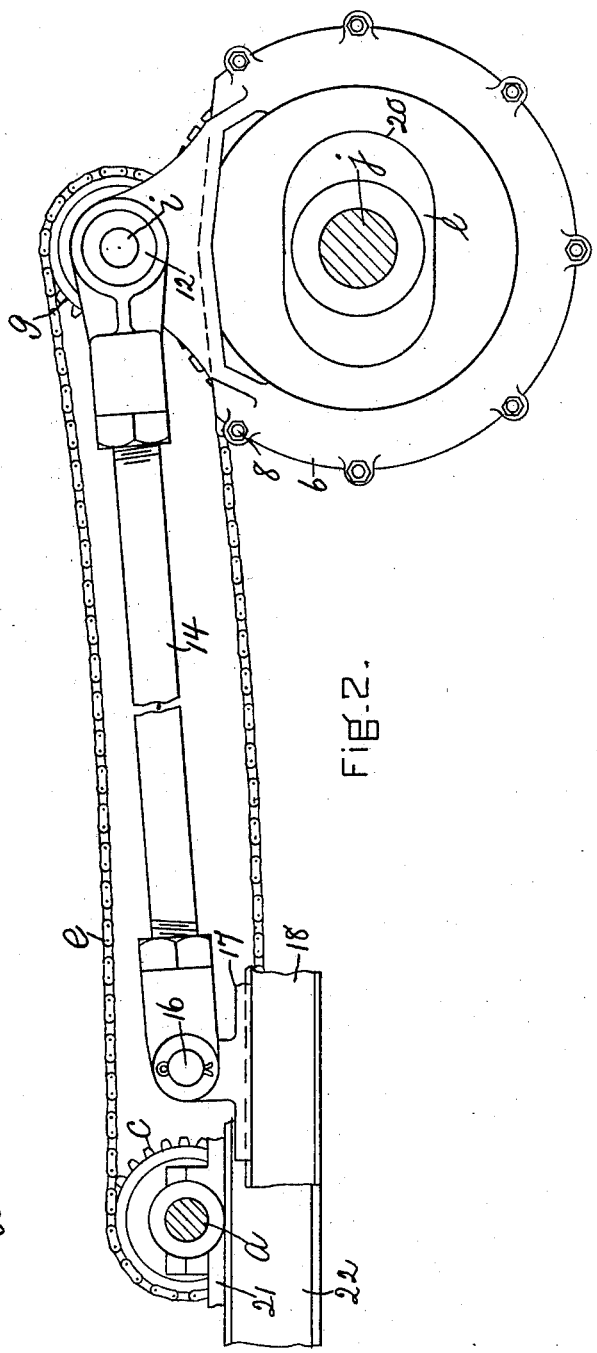
WITNESSES
C. H. Garrett
W. W. Drummond
INVENTOR
Patrick Cunningham
by Jas. F. Churchill
Atty.

No. 660,750. Patented Oct. 30, 1900.
P. CUNNINGHAM.
DRIVING MECHANISM.
(Application filed Mar. 10, 1900.)

(No Model.) 2 Sheets—Sheet 2.

WITNESSES.
C. H. Gannett
J. Murphy

INVENTOR.
Patrick Cunningham
by Jas. H. Churchill
atty.

UNITED STATES PATENT OFFICE.

PATRICK CUNNINGHAM, OF NEW BEDFORD, MASSACHUSETTS, ASSIGNOR OF THREE-FOURTHS TO FRED D. STANLEY, OF SAME PLACE, AND WILLIAM A. WHITTLESEY, OF PITTSFIELD, MASSACHUSETTS.

DRIVING MECHANISM.

SPECIFICATION forming part of Letters Patent No. 660,750, dated October 30, 1900.

Application filed March 10, 1900. Serial No. 8,140. (No model.)

*To all whom it may concern:*

Be it known that I, PATRICK CUNNINGHAM, a citizen of the United States, residing in New Bedford, in the county of Bristol, in the State of Massachusetts, have invented an Improvement in Driving Mechanism, of which the following description, in connection with the accompanying drawings, is a specification, like characters on the drawings representing like parts.

This invention relates to a novel driving mechanism for imparting rotary motion to a shaft from a driving-shaft through an intermediate shaft which is geared to the driven shaft and is connected with and driven from the main or driving shaft.

The invention has for its object to provide means whereby the intermediate shaft may be maintained in a fixed or constant relation to the main or driving shaft, while permitting the driving and intermediate shafts to be changed or moved bodily with relation to the driven shaft, thereby enabling link chains which may and preferably will be used to connect the driving-shaft with the intermediate shaft to be maintained taut under all conditions and avoiding strains upon the chains and the noise resulting from slackening and tightening the same.

The invention is particularly well adapted, among other uses, to be employed on automobiles, and especially those designed for heavy work.

These and other features of this invention will be pointed out in the claims at the end of this specification.

Figure 3:
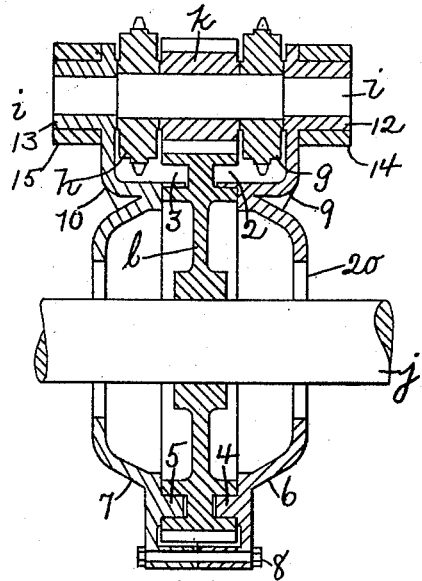
Figure 4:
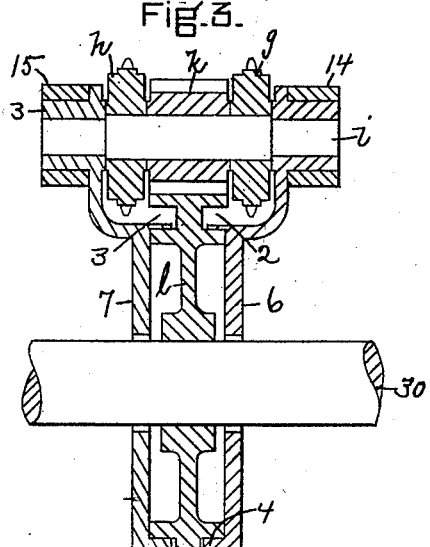

Figure 1 is a plan view of a driving mechanism embodying this invention; Fig. 2, a side elevation of the driving mechanism shown in Fig. 1; Fig. 3, a sectional detail to be referred to, and Fig. 4 a modification to be referred to.

Referring to the drawings, $a$ represents a main or driving shaft having on it a hub $b$, provided with two sprocket-wheels $c$ $d$, connected by link chains $e$ $f$ with two sprocket-wheels $g$ $h$, fast on an intermediate shaft $i$, which is suitably geared to a shaft $j$ to be driven, and in the present instance the shaft $i$ is shown as provided with a pinion $k$, in mesh with a gear $l$ on the shaft $j$. The primary object of this invention is to provide for bodily movement of the driving shaft $a$ and intermediate shaft $i$ toward or away from the driven shaft $j$ without disturbing the relative position of the driving and intermediate shafts, so that the shaft $i$ may have a constant relation to the shaft $a$ under all conditions, thus relieving the mechanism connecting the intermediate shaft with the main or driving shaft from strain and enabling the link chains $e$ $f$ to be kept taut or substantially taut under all conditions. This result may be effected, as herein shown, by providing the gear $l$ with annular grooves 2 3 on its opposite faces or sides, into which extend annular flanges 4 5 on the two parts 6 7 of a casing practically inclosing the gear $l$, the parts of said casing being suitably secured together, as by screws or bolts 8. The parts 6 7 of the casing referred to are provided with upwardly-extended arms 9 10, having tubular extensions or bosses 12 13, forming bearings for the shaft $i$, and upon which are fitted the ends of connecting-rods 14 15, having their other ends mounted on a shaft or pin 16, supported in a bearing 17, which, as shown, rests upon and is suitably secured to an I-beam 18, the bearing 17 being represented as secured to the I-beam by rivets 19. (See Fig. 1.) The connecting-rods 14 15 are of any suitable or usual construction and are adjustable for lengthening and shortening the same, as clearly shown in the drawings. In Figs. 1 and 3 the two parts or halves 6 7 of the casing inclosing the gear-wheel $l$ are shown as provided with elongated openings 20, which construction is adapted for use when the shaft $j$ is designed to have a pivotal motion—as, for instance, when the shaft $j$ is used as the front axle of a vehicle. In Figs. 1 and 2 the shaft $a$ is represented as supported in a bearing 21, suitably attached to the top of an I-beam 22. The I-beams 18 and 22 may form part of the body portion of an automobile wagon or truck, and the shaft $a$ may be connected with a suitable engine, (not herein shown,) and for the purpose of this invention let it be assumed that the shaft $j$ is the front axle of the vehicle—that is, the shaft upon which the front wheels are mounted.

By means of the construction shown in Figs. 1, 2, and 3 it will be seen that the shaft $a$ and the intermediate shaft $i$ have a fixed relation to one another, but are capable of bodily movement with relation to the driven shaft $j$, which movement may be occasioned by the wheels on the shaft $j$ striking an obstacle in front of them, which would arrest the forward movement of the shaft $j$; but the momentum of the vehicle-body carrying the shafts $a$ and $i$ would not be thus arrested, and consequently the shafts $a$ and $i$ would be carried forward bodily, and by reason of the casing being movable in the annular grooves in the gear-wheel $l$ and the pivotal connection of the rods 14 and 15 with the shaft or pin 16 and the bosses 12 13 the intermediate pinion is free to respond to the forward movement and be carried around the gear $l$ until the obstruction is overcome, whereupon the body of the vehicle assumes its normal position or relation to the axle $j$ and the pinion is restored to its normal position. (Shown in the drawings.) As a result the link-chains $e f$ remain taut under all conditions. The shafts $a$ and $i$ may have a bodily movement in the reverse direction with relation to the axle $j$, which may be occasioned by the wheels meeting an obstruction in the act of backing the vehicle. The elongated slot 20 in the casing permits the front shaft $i$ to move as in the act of turning the vehicle; but when the driving-shaft $a$ is connected with similar gearing to that herein shown and mounted on the rear shaft or hind axle of the vehicle the opening 20 may be dispensed with and the two parts of the casing fitted substantially close upon the shaft 30, (see Fig. 4,) which may be supposed to be the rear shaft or axle of the vehicle. It will be understood that a duplicate of the mechanism shown in Fig. 1 may be connected with the rear axle 30 and that the shafts $a$ of both mechanisms may be connected with the same propelling-shaft, which is not herein shown and which may be the crank-shaft of an engine carried by the automobile.

By mounting the rods 14 15 on the pin or stationary shaft 16 the main or driving-shaft $a$ is relieved from excessive friction, which would be occasioned if the said rods were mounted on the main shaft. As a result a very considerable saving in power is effected, and especially so in vehicles having a heavy load, the heavier the load the greater the friction. Furthermore, a considerable saving is effected by dispensing with bearings on the main shaft and oil-cups, &c., which would be required if the rods 14 15 were mounted on the main shaft.

I claim—

1. In an apparatus of the character described, the combination with a main or driving shaft, a driven shaft, an intermediate shaft, means connecting the driving-shaft with the intermediate shaft, means connecting the intermediate shaft with the driven shaft, means disconnected from the driving-shaft to secure the intermediate shaft in a fixed relation to the driving-shaft, and means to permit bodily movement of the driving and intermediate shafts with relation to the driven shaft without disturbing the relative position of the driving and intermediate shafts, substantially as described.

2. In an apparatus of the character described, the combination with a main or driving shaft, a driven shaft, a gear mounted thereon and provided with a circular groove in one of its faces, an intermediate shaft, a pinion in mesh with said gear and mounted on said intermediate shaft, means to rotate the intermediate shaft from the driving-shaft, a support for the intermediate shaft having a flange extended into the circular groove in the said gear, and means to secure the intermediate shaft in a fixed position with relation to the main or driving shaft, substantially as described.

3. In an apparatus of the character described, the combination with a main or driving shaft, a driven shaft, a gear fast on said driven shaft and provided with circular grooves in its opposite sides or faces, an intermediate shaft, a pinion on said intermediate shaft in mesh with the gear on the driven shaft, means connecting the intermediate shaft with the driving-shaft, a two-part casing forming bearings for the intermediate shaft and provided with circular flanges which extend into the grooves on the gear fast on the driven shaft, and rods or links connected to said casing at one end and having their other end secured in a fixed position, substantially as described.

4. In an apparatus of the class described, the combination with a main or driving shaft, a driven shaft, an intermediate shaft, means to rotate the intermediate shaft from the driving-shaft, gearing connecting the intermediate shaft with the driven shaft, a support for the intermediate shaft comprising a casing provided with journals or bosses at its opposite sides and movable on said gearing, and links or rods having one end loosely mounted on said journals or bosses and their other end mounted in a fixed position, substantially as and for the purpose specified.

5. In an apparatus of the class described, the combination with a main or driving shaft, a driven shaft, a gear mounted on said driven shaft, an intermediate shaft, a pinion on said intermediate shaft in mesh with said gear, sprocket-wheels on the driving-shaft and intermediate shaft, link chains connecting said wheels, a support for the intermediate shaft, means to secure one end of said support in a fixed position with relation to the driving-shaft, and means to connect said support with the gear on the driven shaft to permit movement of said support independent of said gear, substantially as described.

6. In an apparatus of the class described, the combination with a main or driving shaft, a driven shaft, an intermediate shaft, means to rotate the intermediate shaft from the driving-shaft, gearing connecting the intermediate shaft with the driven shaft, a support for the intermediate shaft, means to secure one end of said support in a fixed position with relation to the driving-shaft, and means to connect said support with the said gearing to permit movement of the said support independent of said gearing, substantially as described.

In testimony whereof I have signed my name to this specification in the presence of two subscribing witnesses.

PATRICK CUNNINGHAM.

Witnesses:
JAS. H. CHURCHILL,
J. MURPHY.